Nov. 20, 1928.
C. A. STICKNEY
1,692,592
WATER SOFTENER INJECTOR
Filed April 18, 1927
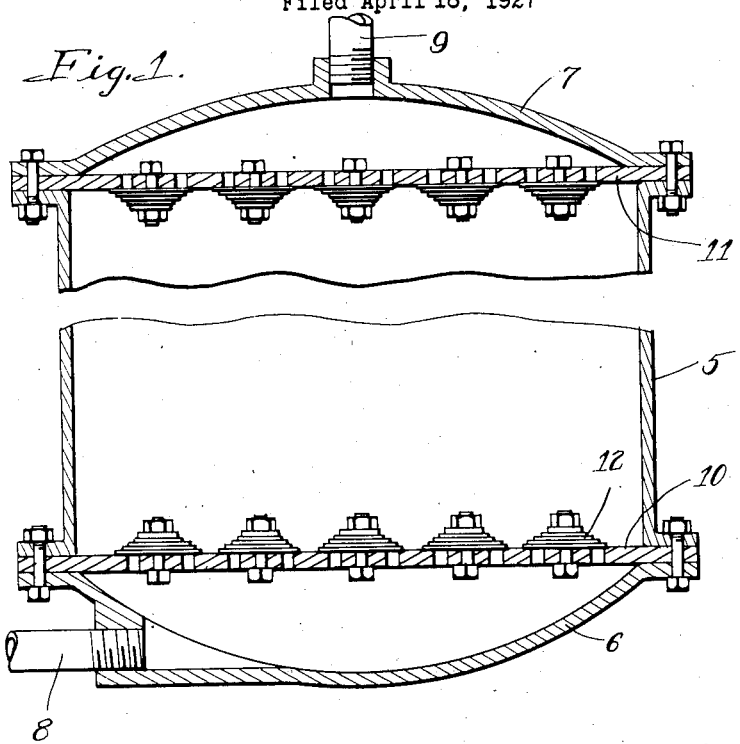
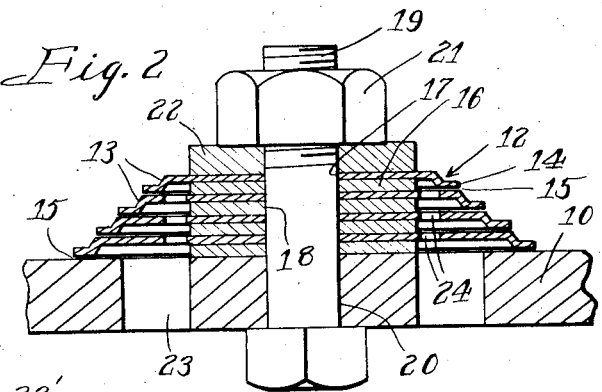
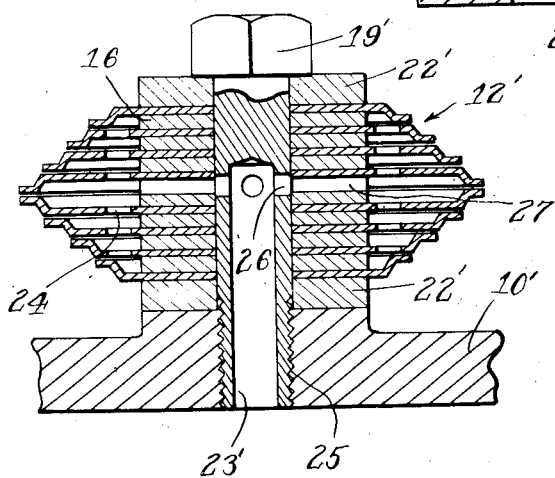
Inventor:
Charles A. Stickney
By Wilson & McCanna
Attys.

Patented Nov. 20, 1928.

1,692,592

UNITED STATES PATENT OFFICE.

CHARLES A. STICKNEY, OF ROCKFORD, ILLINOIS, ASSIGNOR TO STICKNEY HYDRAULIC CO., OF ROCKFORD, ILLINOIS, A CORPORATION OF ILLINOIS.

WATER-SOFTENER INJECTOR.

Application filed April 18, 1927. Serial No. 184,519.

This invention relates to nozzles generally but, more specifically, an injector nozzle especially designed for use in a water softener for uniformly distributing the flow of water throughout the cross-sectional area of the bed of water softening material.

The principal object is to provide an injector means of a simpler and more economical and durable construction than has heretofore been devised and one which does not involve any complications in its installation in a water softener tank, but rather facilitates the construction of the softener.

According to my invention I employ a plate serving as a supporting and retaining medium for the mineral in the softener tank and have a plurality of nozzles mounted thereon in properly dispersed relationship, the nozzles being arranged to distribute the water flowing therethrough uniformly in all directions so that there is no possibility of channeling. The nozzles, as herein illustrated, are constructed of stacks of disks arranged in superimposed relation providing uniform interstices therebetween for the passage of the water. These nozzles, or strainer heads as they are sometimes called, constitute individual units for separate replacement, inspection, and cleaning or repair.

The invention is illustrated in the accompanying drawing wherein—

Figure 1 is a cross-section through a water softener tank showing the use of my improved injector means at the top and bottom, an intermediate portion of the tank being broken away;

Fig. 2 is an enlarged sectional detail of one of the nozzles; and

Fig. 3 is a similar view of a modified or alternative construction.

The same or similar reference numerals are applied to corresponding parts.

The water softener illustrated is of a purely conventional form consisting of a tank 5 to receive the bed of zeolite mineral, or other water softening material, and having hollow base and cap pieces 6 and 7 to provide connection, as at 8 and 9, with the hard water supply and the service system or vice versa, depending on whether the softener operates with upflow or downflow. So far as the present invention is concerned the direction of flow is immaterial. Where the softener operates with upflow there must be provided in addition to the injector plate 10 at the bottom of the tank an injector plate 11 at the top, if the size of the tank is such as does not allow for sufficient head room or settling space above the bed of water softening material. In other words, the use of injector plates at both ends permits of greater compactness in design. Where the softener operates with downflow and the regeneration is also in a downward direction it will, of course, be obvious that there would be no need for an upper injector plate.

The injector means at both ends of the tank are of practically identical construction so that the description of the one will suffice for both, it being noted that the only difference between the two injector means is that the nozzles 12 on the plate 11 are carried on the under side, whereas those on the plate 10 are carried on the top. Referring to Fig. 2, it will be noted that each nozzle or strainer head comprises a plurality of disks 13 of graduated diameters and arranged in superimposed relation, each disk having a flanged rim 14 arranged in slightly spaced relation to the top of the next adjacent disk so as to leave interstices 15 between the disks. The lowermost disk provides an interstice 15 between it and the plate 10, as shown. The size of the interstices is determined by the thickness of spacing washers 16 interposed between adjoining disks. The disks 13 have central openings 17 and the washers 16 have central openings 18 arranged to register when the disks and washers are stacked in the manner shown so as to receive a single central retaining or fastening bolt 19. The latter passes through an opening 20 provided in the plate 10 and receives a nut 21 and washer 22 for clamping the stack of disks and washers in assembled relation on the plate 10. The plate 10 has openings 23 therethrough establishing communication with the under side of the lowermost disk of the stack, and all of the disks, except the uppermost one, are provided with openings 24 serving to establish communication between the interstices of the stack of disks and communication with the openings 23, whereby to permit the passage of fluid through the nozzle or strainer head 12 and through the plate 10 in either direction by way of the interstices 15. The disks 13 are preferably of a rust resisting metal, such as Monel metal, and the same may be true of the bolt 19 with its nut 21, washers 16 and 22 and plate 10, if that is desired. The principal precaution, however, is taken with the disks 13 in order to insure the maintenance of interstices of a predetermined size. It is found that the construction shown gives absolutely uniform distribution of the water flow throughout the cross-sectional area of the bed of water softening material and that there is not the slightest indication of channeling under normal operating water pressures.

I have shown in Fig. 3, indicated at 12', an alternative or modified construction of nozzle or strainer head on an injector plate 10'. In this construction the disks are of graduated diameters increasing, not from an apex point toward a base point as in the case of the construction of Fig. 2, but from apex points at opposite ends of the stack toward an intermediate point in the stack. All of the disks with the exception of the end ones are provided with the opening 24 to establish communication between the interstices of the stack of disks, and with the fluid passage through the injector plate, as will presently appear. Washers 22' are employed at opposite ends of the stack for holding the disks in assembled relation with the washers 16 inserted therebetween. A single bolt 19' threading, as shown at 25, in an opening in the injector plate 10' serves to clamp the parts together in assembled relation and also provides a fluid passage 23' centrally therein which communicates by way of the radial opening 26 in the bolt 19', with radial openings 27 provided in one of the spacing washers 16 so as to communicate with the space between two of the disks of the stack and thereby have communication with all of the interstices by way of the opening 24 in a manner believed to be obvious. This construction is obviously somewhat simpler than that shown in Fig. 2 and does away with the necessity for providing additional openings 23 in the injector plate, the single threaded opening 25 which receives the bolt 19' providing in the same opening a fluid passage through the plate.

I claim:

1. A liquid injector or ejector nozzle, such as adapted for use in distributing the water flow through a water softener, the said nozzle comprising a series of disks of graduated sizes one superposed on another in the order of size so that the peripheral portion of each disk is disposed above the marginal portion of the top of the next larger disk, or beneath the bottom thereof, as the case may be, the peripheral portion of each disk being offset in the form of a flanged rim between which rim and the next adjoining disk an interstice is arranged to be formed, means serving to space the disks according to the predetermined size of interstices desired, and means for supporting the stack of disks in the relation described and provided with a fluid passage communicating with the interstices between the disks.

2. A nozzle as set forth in claim 1 including two sets of disks of graduated sizes increasing from apex points at opposite ends of the stack toward an intermediate point in the stack, the disks of one set being reversed in position as respects the disks in the other set and the largest disks of the two sets being of substantially the same size with the offset flanged rims thereof providing an interstice therebetween, and the means for supporting the disks having communication with the interstice between the last mentioned disks, and in turn with the interstices between the other disks.

3. A liquid injector or ejector nozzle, such as adapted for use in distributing the water flow through a water softener, the said nozzle comprising two sets of disks of graduated sizes disposed in a stack, the disks increasing in size from apex points at opposite ends of the stack toward an intermediate point, the peripheral portion of each disk being offset in the form of a flanged rim disposed above the marginal portion of the top of the next larger disk, or beneath the bottom thereof, as the case may be, there being an interstice formed between each rim and the next adjoining disk, the disks of one set being reversed in position as respects the disks in the other set and the largest disks of the two sets being of substantially the same size with the offset flanged rims thereof providing an interstice therebetween, means serving to space the disks according to the predetermined size of interstice desired, and a single bolt for holding all of the disks of the stack together, said bolt passing through the stack of disks and being arranged to be mounted on a support, said bolt having a fluid passage therein communicating with the interstice between the largest disks of the two sets and in turn with the interstices between the other disks.

In witness of the foregoing I affix my signature.

CHARLES A. STICKNEY.